United States Patent
Ramakrishnan

(10) Patent No.: US 9,143,819 B2
(45) Date of Patent: Sep. 22, 2015

(54) REDUCING ENERGY CONSUMPTION OF AN EDGE DEVICE

(75) Inventor: Sangeeta Ramakrishnan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1224 days.

(21) Appl. No.: 12/578,506

(22) Filed: Oct. 13, 2009

(65) Prior Publication Data

US 2011/0085481 A1 Apr. 14, 2011

(51) Int. Cl.
 *H04N 21/426* (2011.01)
 *H04N 21/438* (2011.01)
 *H04N 21/443* (2011.01)

(52) U.S. Cl.
 CPC ..... *H04N 21/42607* (2013.01); *H04N 21/4381* (2013.01); *H04N 21/4436* (2013.01)

(58) Field of Classification Search
 None
 See application file for complete search history.

(56) References Cited

U.S. PATENT DOCUMENTS

2008/0209246 A1* 8/2008 Marks et al. .................. 713/323
2009/0147723 A1* 6/2009 Fang et al. .................... 370/315

OTHER PUBLICATIONS

Edge Resource Manager Interface Specification CM-SP-ERMI-I02-051209 CableLabs Dec. 9, 2005.*
Cable Television Laboratories, Inc., "Data-Over-Cable Service Interface Specifications DOCSIS 3.0, Physical Layer Specification", CM-SP-PHYv3.0-I08-090121, Jan. 21, 2009, 169 pages.

* cited by examiner

*Primary Examiner* — Jackie Zuniga Abad
(74) *Attorney, Agent, or Firm* — Leon R. Turkevich

(57) ABSTRACT

In one example, a resource manager for an edge device is configured to intelligently distribute streams over the RF channel interface of the edge device. As a result of this intelligent stream distribution by the resource manager, the likelihood that the edge device can power down inactive internal components is significant, especially during periods of low activity.

20 Claims, 4 Drawing Sheets

REDUCING ENERGY CONSUMPTION OF AN EDGE DEVICE

BACKGROUND

An edge device such as an Edge Quadrature Amplitude Modulation (EQAM) modulates data for transmission over a Hybrid Fiber Coaxial (HFC) network. One type of EQAM, namely a "Universal" EQAM, is configured to modulate both Moving Pictures Experts Group (MPEG) formatted data from a video server and Data Over Cable Service Interface Specification (DOCSIS) formatted data sent from a Modular CMTS (M-CMTS) headend.

Typically these edge devices have a plurality of internal components. Each of these internal components consumes energy even during non-peak hours where the overall utilization of the edge device is relatively low.

DESCRIPTION OF EXAMPLE EMBODIMENTS

Overview

In one example, a resource manager for an edge device is configured to intelligently distribute streams over the RF channel interface of the edge device. As a result of this intelligent stream distribution by the resource manager, the likelihood that the edge device can power down inactive internal components is significant, especially during periods of low activity.

Description

Figure 1:
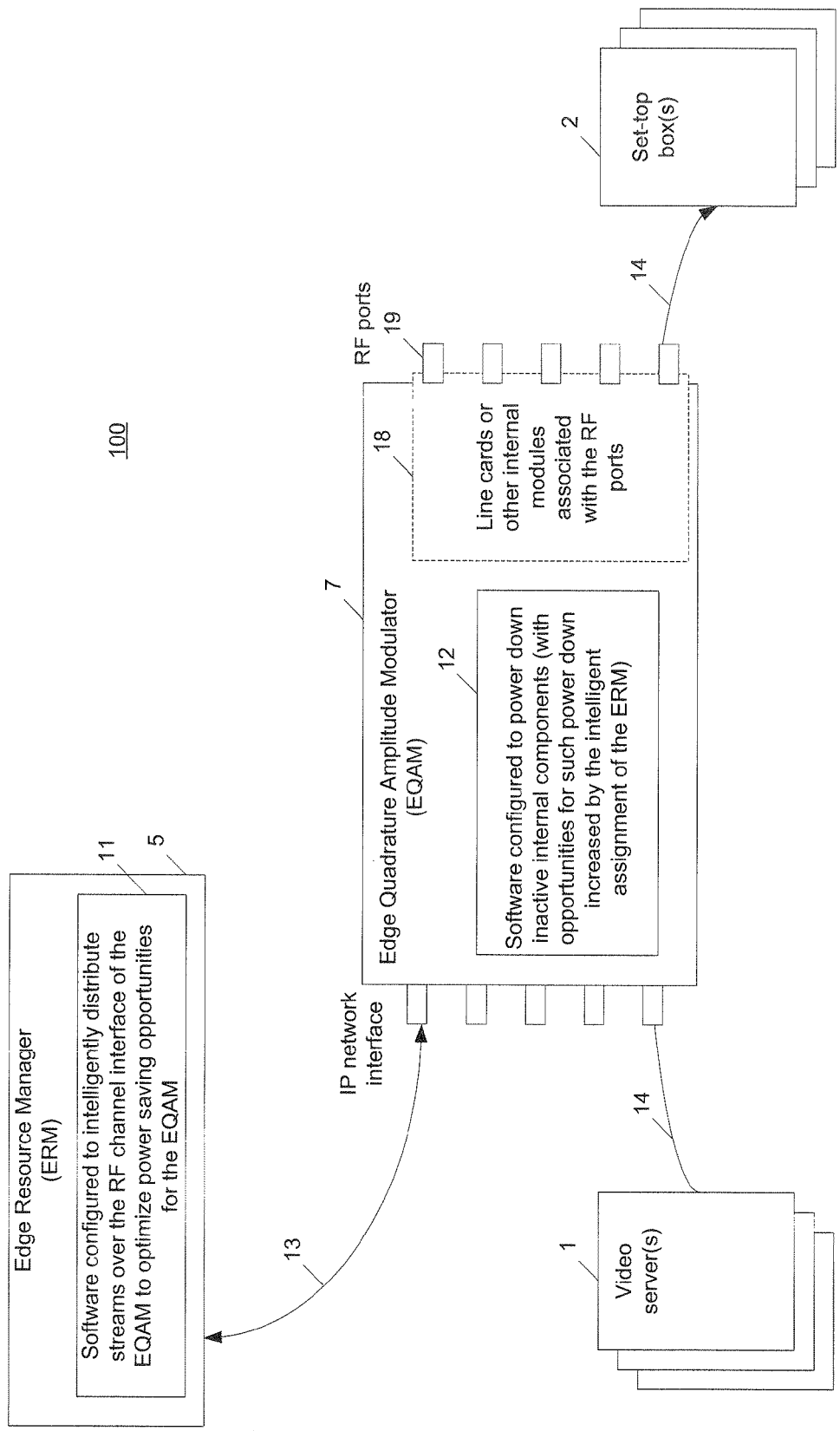
FIG. 1 illustrates a system for intelligently distributing streams over a Radio Frequency (RF) channel interface of an Edge Quadrature Amplitude Modulator (EQAM) to optimize power saving opportunities for the EQAM.

FIG. 1 illustrates a system for intelligently distributing streams over a Radio Frequency (RF) channel interface of an Edge Quadrature Amplitude Modulator (EQAM) to optimize power saving opportunities for the EQAM.

The system 100 includes an Edge Resource Manager (ERM) 5 and an Edge Quadrature Amplitude Modulator (EQAM) 7. The software 11 of the ERM 5 is configured to intelligently distribute streams over the RF channel interface of the EQAM 7 to optimize power savings opportunities for the EQAM 7. The software 12 of the EQAM 7 is configured to exchange signaling 13 with the ERM 5 and to power down inactive internal components to reduce energy consumption.

To appreciate how the intelligent distribution of streams over the RF ports 19 of the EQAM interface increases power savings opportunities for the EQAM 7, an understanding of the RF-side interface of the EQAM 7 will be helpful. The dashed line box 18 represents at least one (but typically a plurality) of other internal modules of the EQAM 7 associated with processing information to be transmitted over the RF ports 19, each of which can contain multiple hardware components such as upconverters, Central Processing Units (CPUs), Field Programmable Gate Arrays (FPGAs), etc. Each of these line cards corresponds to a different subset of the RF ports 9. In turn, each of the multiple RF ports 9 of the EQAM 7 has multiple RF channels extending therefrom. In turn, each of these RF channels can carry multiple streams (the term stream refers to a Moving Pictures Experts Group (MPEG) flow 14 or other flow extending from an encoder 1 to a decoder 2).

Thus, to summarize the previous paragraph, the EQAM 7 is associated with a number of internal line cards (box 18), a greater number of RF ports 19, and a still greater number of RF channels. Any given stream being processed by the RF-side interface of the EQAM 7 is associated with only a portion of the internal modules (box 18), only a portion of the RF ports 19, and only a portion of the RF channels.

It is known in the field of computing that inactive components can be powered down. During peak hours for a conventional EQAM, many of the RF-side hardware components are active because the total bandwidth of all existing streams can approach the total bandwidth capability of all the RF channels of all the RF ports 19. During non-peak hours for a conventional EQAM, although the total bandwidth of all current streams is typically a small fraction of the total bandwidth capability of all the RF channels, all of the RF-side hardware components are active typically carrying just one or a handful of streams, because of the way streams are assigned by a conventional EQAM (or ERM). Moreover, during non-peak hours, even if the EQAM was not assigned any streams, the RF hardware components are still active and carrying null packets.

In contrast, the system 100 operates to intelligently assign streams to RF ports 19 so that during non-peaks hours any active streams are consolidated on a subset of the RF-side hardware. This intelligent stream assignment can result in a significant portion of the RF-side hardware being inactive, e.g. not carrying any streams, during non-peak hours. The system 100 can then power down such inactive components to realize savings in energy consumption.

The powered down components can include the RF ports 19 or RF channels of the RF ports 19. Furthermore, if RF ports 19 associated with a same line card of the EQAM 7 are inactive, then the system 100 can power down hardware components of such line card (including powering down hardware components of the line card such as the line card's upconverter on an individual basis). Such hardware components of the line card may be referred to as being "upstream" relative to the RF ports 19. It should be appreciated that the power savings realized by powering down N ports associated with a same line card is greater than the power savings realized by powering down N ports spread amongst a plurality of line cards because the former scenario increases opportunities for powering down upstream hardware components. Similarly, it should be appreciated that the power savings realized by powering down N RF channels associated with a same RF port is greater than the power savings realized by powering down N RF channels spread amongst a plurality of RF ports because the former scenario allows an entire RF port to be shut down in addition to the QAMs of the inactive RF channels.

The signaling 12 can provide hardware domain information to the ERM 5. This hardware domain information can associate a plurality of RF channels that extend from a same RF port 19 and may additionally associate RF channels extend from a plurality of RF ports that are inter-dependent on a common upstream hardware component.

The signaling 12 can also be used to control when the EQAM 7 powers down a designated portion of the RF ports 19 and/or when the EQAM 8 powers down a designated portion of the internal components of dashed line box 18. Likewise, the signaling 12 could also be used to control when the EQAM 7 subsequently powers up such powered down components.

Having explained several principles above with respect to the system 100, a more detailed particular example of an ERM and EQAM utilizing these principles will now be explained with reference to FIG. 2. Before referring to FIG. 2, it should be understood that this example is only of many possible implementations of the principles described above. For example, the principles described above can be applied to any edge device, not just an EQAM, regardless of whether such edge device is configured to process Data Over Cable Services Interface Specification (DOCSIS) or MPEG formatted data. It should be understood that an edge device is any device that modulates data for transmission over an RF network. Although EQAMs are managed by a remotely located resource manager, it is possible that other edge devices may integrate a resource manager therein.

Figure 2:
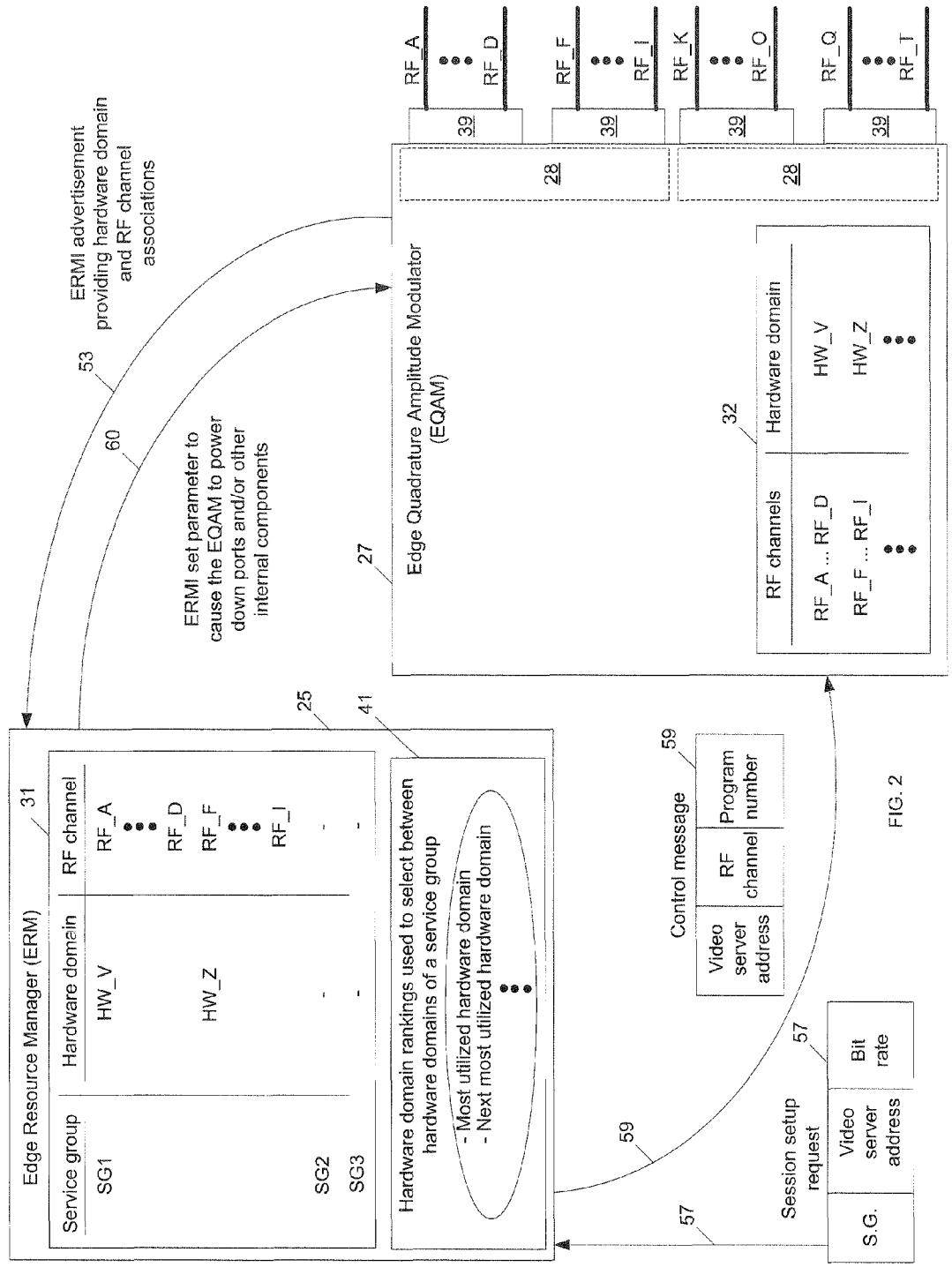
FIG. 2 illustrates one example of an Edge Resource Manager (ERM) and an EQAM utilizing principles described with reference to FIG. 1.

FIG. 2 illustrates one example of an Edge Resource Manager (ERM) and an EQAM utilizing principles described with reference to FIG. 1.

The EQAM 27 maintains a table 32 associating the RF channels extending therefrom with hardware domains. Each hardware domain in the table 32 includes all the RF channels associated with a common hardware component of the EQAM 27, such as a single one of the RF ports 39 (another example of a hardware domain will be discussed in the next paragraph). For example, the hardware domain V corresponds to RF channels RF_A-RF_D, the hardware domain Z corresponds to RF channels RF_F-RF_I, etc.

As previously mentioned, in the present example each hardware domain can include the RF channels of one of the RF ports 39. In other examples, each hardware domain includes the RF channels associated with a common "upstream" hardware component of the EQAM 27 such as one of the line cards 28, which in turn corresponds to more than one of the RF ports 39. So in another example a hardware domain X could include, for example, RF channels RF_A-RF_I, all of which are associated with one of the line cards 28. Or in another example, a hardware domain Y could include, for example, RF channels RF_A-RF_T, all of which are associated with the EQAM 27 itself.

The EQAM 27 provides the domain-channel associations to the ERM 25 via signaling 53. In the present example, the EQAM 27 utilizes an extended Edge Resource Management Interface (ERMI) advertisement to send this information out from an IP interface of the EQAM 27 to the ERM 25. The extended ERMI advertisements can be sent at any time, such as whenever the EQAM makes an update to the table 32, at regular intervals, along with advertisements of other information for the RF channels, etc. In other examples, the ERM 25 could send a Simple Network Management Protocol (SNMP) get to query a Management Information Base (MIB) on that EQAM 27 that contains these associations.

The ERM 25 maintains the table 31 associating service groups, e.g. a logical grouping of downstream devices, hardware domains, and RF channels. In the example, the service group 1 is associated with hardware domains V and Z, which contain RF channels RF_A-RF_D and RF_F-RF_I, respectively. Typically the ERM 25 will have access to a database associating RF channels to service groups, so the ERM 25 can maintain the table 31 by drawing from this database in addition to the signaling 53 exchanged with the EQAM 27.

As users request streams using their set top box or other downstream device possibly via some scheme such as Video On Demand (VOD) or Switched Digital Video (SDV), the ERM 25 will receive session setup requests 57 from a video server or a session manager associated with the video server. Such requests will typically specify a service group, a video server address, and a bit rate.

The ERM 25 is configured to compare the service group identified in the received stream request 57 to the table 31. According to the comparison, corresponding hardware domains are identified. For example, the table 31 shows hardware domains V and Z, both corresponding to service group 1.

The ERM 25 then filters the identified hardware domains according to a ranking 41, which could be stored on the ERM 25 or generated dynamically according to an algorithm. The ranking 41 identifies at least a currently preferred hardware domain, and may also identify a next most currently preferred hardware domain, a next most currently preferred hardware domain after that, etc. The highest ranked hardware domain in the ranking 41 (again in some examples the ranking may only include one hardware domain) is a current target for consolidating new data streams. The ranking 41 can be based on current usage of the hardware domains, so that the highest ranked hardware domain in the ranking 41 is the hardware domain having the most currently active streams (or highest total currently used bandwidth) and a lowest ranked hardware domain is the hardware domain having the least currently active streams (or lowest total currently used bandwidth). The ERM 25 selects the highest ranked associated hardware domain according to the ranking 41.

Once the hardware domain is selected using the ranking 41, the ERM 25 selects an RF channel for the requested stream from the selected hardware domain. For example, if the selected hardware domain is domain Z, the ERM 25 will select an RF channel from the RF channels RF_F-RF_I according to any scheme such as a round robin scheme.

Another possible scheme for selecting an RF channel from the corresponding RF channels RF_F-RF_I of the selected hardware domain is optimized in view of high definition video stream. In this HD-optimized approach, certain ones of the corresponding RF channels RF_F-RF_I are designated to receive standard definition to increase the likelihood that the remaining ones of the corresponding RF channels RF_F-RF_I will have sufficient bandwidth available to add a high definition video stream at a later time. This is because high definition video streams can use a significant portion (close to a third) of the bandwidth of each RF channel.

Regardless of how the ERM 25 selects an RF channel from the corresponding RF channels RF_F-RF_I, the ERM 25 may determine whether an initially selected one of the corresponding RE channels RF_F-RF_I has enough bandwidth available before making a final selection. It is preferable for the EQAM 25, if possible, to allocate streams on the RF channels of the selected hardware domain such that the number of utilized RF channels within the selected hardware domain is minimized. It should be understood that, if none of the RF channels RF_F-RF_I have enough bandwidth available, the ERM 25 may select from RF channels of another hardware domain to ensure that the request is met.

Having selected an RE channel, the ERM 25 sends a control message 59 for causing the EQAM 27 to place a particular stream on the selected RF channel. In the present example, the control message 59 is sent to the EQAM 27 and identifies a source address, the selected RF channel, and a program number corresponding to the stream. The EQAM 27 begins forwarding the identified stream on the identified RF channel.

Thereafter, at some later time (not necessarily a time corresponding to the receive time of any session setup requests), the EQAM 27 powers down inactive RF-side hardware components such as the RF ports 39 and any corresponding upstream hardware components of the EQAM. If the hardware domains each correspond to one RF port 39, it is less likely that the EQAM 27 will have inactive upstream components 28, so the EQAM 27 may power down only RF ports 39 or QAMs for RF channels. If the hardware domains each correspond to a group of RF ports 39 associated with a common upstream hardware component (such as a common upconverter), then it is more likely that the EQAM 27 will have inactive upstream components 28, so the EQAM 27 may power down both RF ports 39 or QAMs for RF channels and upstream components 28 such as the upconverter. The EQAM 27 can power down an entire hardware domain in unison or power down only a subset of hardware components of a power domain at any given instant.

The powering down of the EQAM 27 hardware components can be initiated by any mechanism. In the present example, the ERM 25 controls the power down using signaling 60 such as an ERMI set parameter or an SNMP set. The ERM 25 selects such power down times to correspond with traffic trends. In other examples, the EQAM 27 monitors for inactive components, e.g. components not currently processing any streams, and when detected, determines whether or not to power down such inactive components.

It should be apparent that, due to the intelligent distribution of the streams over the RF interface of the EQAM 27, the number of inactive hardware components will be significant during non-peak hours. Accordingly, energy consumption of the EQAM 27 is reduced as compared to conventional EQAMs.

Figure 3:
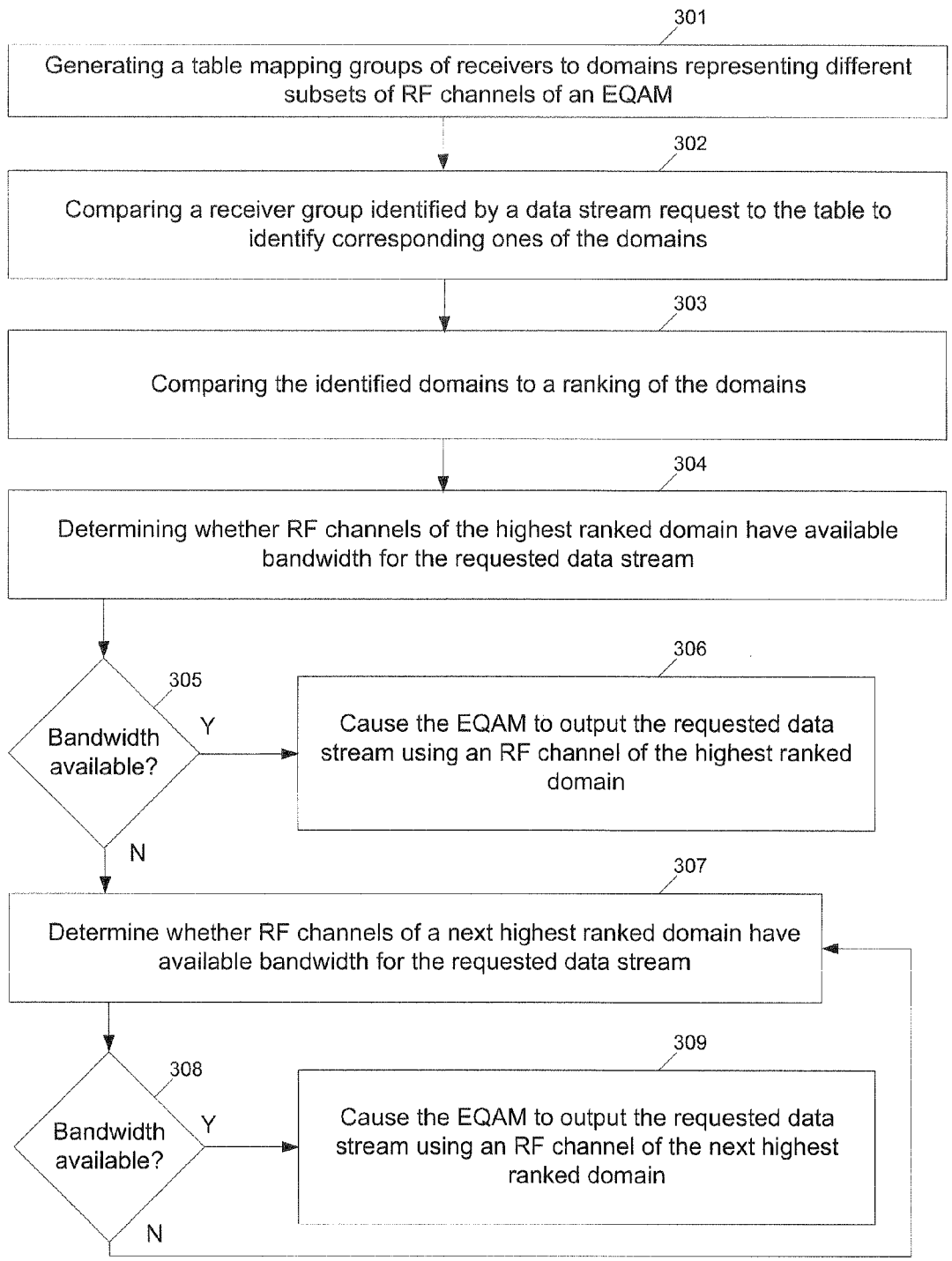
FIG. 3 illustrates how the ERM shown in FIG. 2 intelligently distributes streams over the RF channel interface of the EQAM.

FIG. 3 illustrates how the ERM shown in FIG. 2 intelligently distributes streams over the RF channel interface of the EQAM.

In block 301, the ERM generates a table mapping groups of receivers to domains representing different subsets of RF channels of an EQAM.

In block 302, the ERM receives a data stream request and compares a receiver group identified therein to the table to identify corresponding ones of the domains. In block 303, the ERM compares the identified domains to a ranking of the domains. In block 304, the ERM determines whether the RF channels of the highest ranked domain have available bandwidth for the requested data stream.

If bandwidth is available in diamond 305, then in block 306 the ERM causes the EQAM to output the requested data stream using an RF channel of the highest ranked domain. It should be understood here and throughout that the terms "an RF channel" mean "one or more RF channels" unless otherwise noted.

Otherwise, if the bandwidth is not available in diamond 305, then in block 307 the ERM can determine whether RF channels of a next highest ranked domain have available bandwidth for the requested data stream. It should be understood that the ranking may include only one domain (such as the currently highest utilized domain), and in such a case, the ERM can fall back to an RF channel of any domain to ensure that the request is met.

Assuming for the sake of explanation that there is a next ranked domain in the ranking, then in block 307 the ERM determines whether RF channels of a next highest ranked domain have available bandwidth for the requested data stream. If bandwidth is available in diamond 308, then in block 308 the ERM causes the EQAM to output the requested data stream using an RF channel of the next highest ranked domain. Otherwise, the process returns to block 307.

Figure 4:
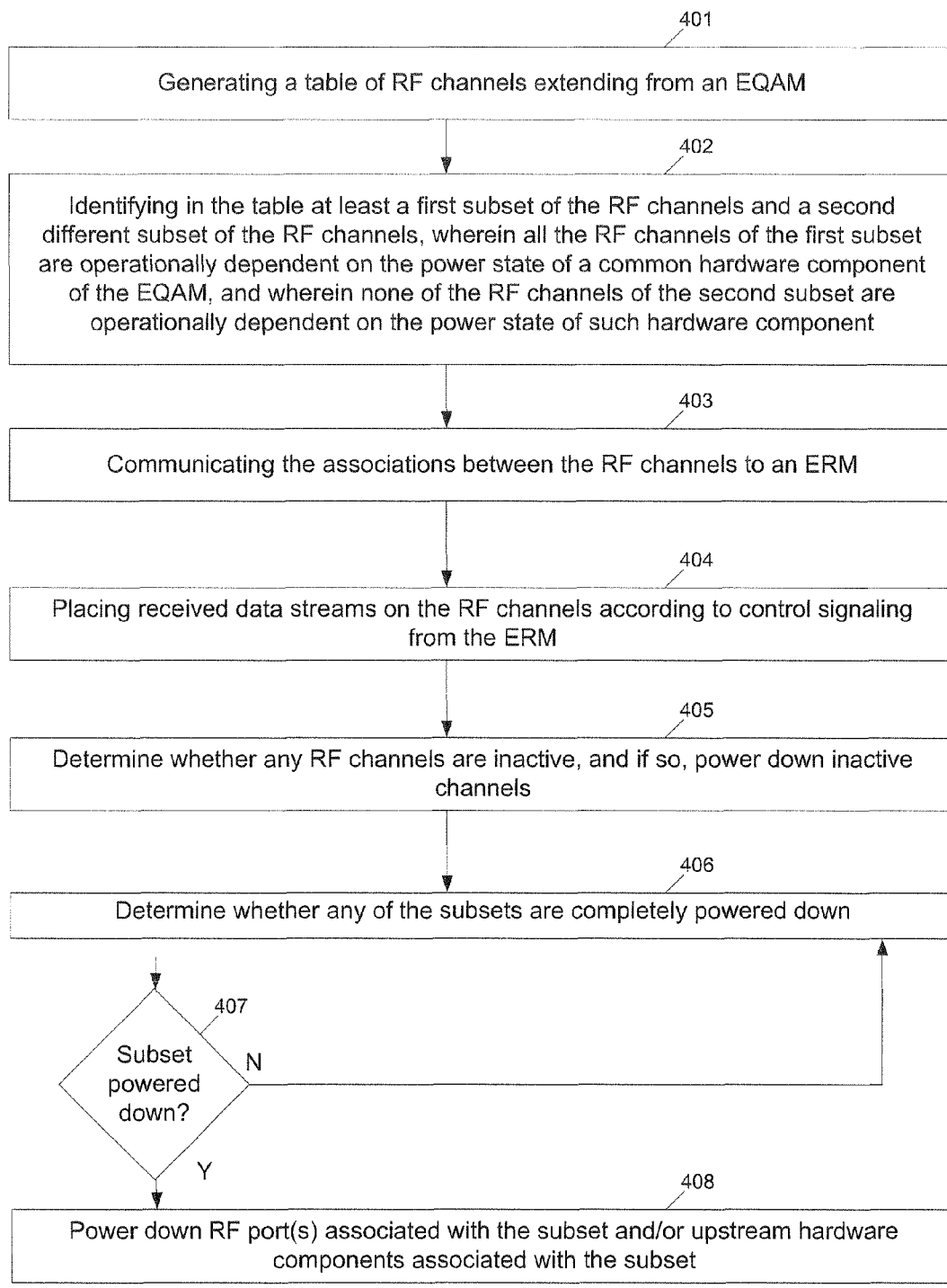
FIG. 4 illustrates how the EQAM shown in FIG. 2 operates to reduce energy consumption.

FIG. 4 illustrates how the EQAM shown in FIG. 2 operates to reduce energy consumption.

In block 401, the EQAM generates a table of RF channels extending therefrom. The EQAM also identifies in the table at least a first subset of the RF channels and a different subset of the RF channels, wherein all the RF channels of the first subset are operationally dependent on the power state of a common hardware component of the EQAM, and wherein none of the RF channels of the second subset are operationally dependent on the power state of such hardware component in block 402.

In block 403, the EQAM communicates the associations between the RF channels to an ERM. In block 404, the EQAM places received data streams on the RF channels according to control signaling from the ERM.

In block 405, the EQAM determines whether any RF channels are inactive, and if so, powers down inactive channels. It is possible for the EQAM to send information to the ERM regarding the inactive channels and perform such power down according to signaling from the ERM.

In block 406, the EQAM determines whether any of the subsets are completely powered down. If any subsets are completely powered down in diamond 407, an entire power domain is inactive, and thus in block 408 the EQAM can power down RF port(s) associated with the subset and/or upstream hardware components associated with the subset for further power savings. It is possible for the EQAM to send information to the ERM regarding the inactive domain and perform such power down according to signaling from the ERM. If no subset is completely powered down, the EQAM can repeat block 406 a later time.

It will be apparent to those having skill in the art that many changes may be made to the details of the above-described embodiments without departing from the underlying principles. The scope of the present disclosure should, therefore, be determined only by the following claims.

Most of the equipment discussed above comprises hardware and associated software. For example, the typical edge device is likely to include one or more processors and software executable on those processors to carry out the operations described. Likewise, the typical edge device manager is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments may include executable programs or instructions that are stored in machine-readable or computer-readable storage media, such as a digital memory. We do not imply that any specific type of computer is required. For example, various processors, embedded or otherwise, may be used in equipment such as the components described herein. The term circuitry used herein can refer to any of the hardware used to execute a program or routine, or to any hardware that can be used to implement the principles described herein independently of software.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there will typically be a corresponding software product at the transmitting end of the transmission, or the receiving end, or both.

Having described and illustrated a particular example, it should be apparent that the invention may be modified in arrangement and detail without departing from such principles. We claim all modifications and variations coming within the spirit and scope of the following claims.

The invention claimed is:

1. A non-transitory processor readable medium encoded with instructions that, if executed, result in:
generating a table of Radio Frequency (RF) channels extending from an Edge Quadrature Amplitude Modulator (EQAM);
identifying in the table at least a first subset of the RF channels in a first hardware domain of the EQAM and a second different subset of the RF channels in a second hardware domain of the EQAM, wherein all the RF channels of the first subset are operationally dependent on the power state of a common hardware component associated with the first hardware domain of the EQAM, and wherein none of the RF channels of the second subset are operationally dependent on the power state of such hardware component of the EQAM;
communicating the associations between the RF channels to an Edge Resource Manager (ERM); and
placing streams on the first subset of RF channels according to control signaling from the ERM, the control signaling from the ERM causing the EQAM to optimize power savings based on consolidating the streams onto the first subset of RF channels and minimizing use of the second subset of RF channels associated with the second hardware domain, enabling the EQAM to power down the second subset of RF channels to reduce power consumption based on a determined inactivity of the second subset of RF channels.

2. The non-transitory processor readable medium of claim 1, wherein the instructions, if executed, result in:
setting the power state of the hardware component of the EQAM based on whether any of the RF channels of the first subset are currently carrying a data stream.

3. The non-transitory processor readable medium of claim 1, wherein the hardware component is a single RF port of the EQAM, and wherein all of the RF channels of the first subset extend from such single RF port and none of the RF channels of the second subset extend from such single RF port.

4. The non-transitory processor readable medium of claim 1, wherein the hardware component operates upstream relative to RF ports of the EQAM, and wherein the RF channels of the first subset extend from more than one of the RF ports.

5. The non-transitory processor readable medium of claim 4, wherein the hardware component comprises an upconverter of the EQAM, a Central Processing Unit (CPU) of the EQAM, or a Field-Programmable Gate Array (FPGA) of the EQAM.

6. The non-transitory processor readable medium of claim 1, wherein the instructions, if executed, result in:
sending an Edge Resource Management Interface (ERMI) advertisement having an extension that correlates RF channels to hardware domains.

7. The non-transitory processor readable medium of claim 1, wherein the instructions, if executed, result in:
setting the power state of the hardware component according to an ERMI set message generated by the ERM.

8. A non-transitory processor readable medium encoded with instructions that, if executed, result in:
generating a table mapping service groups to hardware domains of an Edge Quadrature Amplitude Modulator (EQAM), wherein each hardware domain includes a different subset of Radio Frequency (RF) channels of the EQAM;
in response to receiving a request for a data stream, comparing a service group indicated by the data stream request to the generated table to identify corresponding ones of the hardware domains;
selecting, for the request, a first of the identified hardware domains based on being ranked as having a higher use relative to a second hardware domain having a lower use; and
causing the EQAM to process the requested data stream using an RF channel of the first hardware domain, including causing the EQAM to optimize power savings based on consolidating the streams onto the RF channel of the first hardware domain and minimizing use of the second hardware domain, enabling the EQAM to power down at least a portion of the second hardware domain of the EQAM to reduce power consumption based on a determined inactivity of the portion of the second hardware domain.

9. The non-transitory processor readable medium of claim 8, wherein the selection is based on a ranking of the hardware domains, and wherein such selection based on the hardware domain ranking causes newly requested data streams to be consolidated onto only a portion of RF channels of the EQAM.

10. The non-transitory processor readable medium of claim 9, wherein the instructions are further configured to generate and send control signaling to the EQAM to cause the EQAM to power down RF ports associated with a remaining subset of the RF channels of the EQAM.

11. The non-transitory processor readable medium of claim 8, wherein the instructions, if executed, result in:
comparing the identified hardware domains to a stored current ranking of the hardware domains and performing the selection according to such comparison.

12. The non-transitory processor readable medium of claim 8, wherein each hardware domain includes RF channels corresponding to only one RF port.

13. The non-transitory processor readable medium of claim 8, wherein each hardware domain includes RF channels corresponding to a plurality of RF ports, and wherein each plurality of RF ports is operationally dependent on the power state of a common hardware component operating upstream of the RF ports.

14. The non-transitory processor readable medium of claim 13, wherein RF ports of one hardware domain operate independently of the power state of RF ports of another hardware domain.

15. The non-transitory processor readable medium of claim 13, wherein all RF ports of a first one of the hardware domains correspond to a same first line card of the EQAM, and wherein all RF ports of a second one of the hardware domains correspond to a same second different line card of the EQAM.

16. A method, comprising:
  generating a table mapping groups of receivers to hardware domains representing different hardware portions of an edge device implemented as an Edge Quadrature Amplitude Modulator (EQAM);
  in response to receiving a request for a data stream, comparing a receiver group indicated by the data stream request to the generated table to identify corresponding ones of the domains;
  selecting, for the request, a first of the identified hardware domains based on being ranked as having a higher use relative to a second hardware domain having a lower use; and
  causing the edge device to process the requested data stream using a Radio Frequency (RF) channel corresponding to the first hardware domain, including causing the edge device to optimize power savings based on consolidating the streams onto the RF channel of the first hardware domain and minimizing use of the second hardware domain, enabling the edge device to power down at least a portion of a second hardware domain of the edge device to reduce power consumption based on a determined inactivity of the portion of the second hardware domain.

17. The method of claim 16, wherein the selection is based on a ranking of domains, and wherein such selection based on the domain ranking causes newly requested data streams to be consolidated onto a subset of RF channels of the edge device.

18. The method of claim 17, further comprising generating and sending control signaling to the edge device to cause the edge device to power down RF ports associated with a remaining subset of the RF channels.

19. The method of claim 17, wherein each domain includes RF channels corresponding to only one RF port of the edge device.

20. The method of claim 17, wherein each domain includes RF channels corresponding to a plurality of RF ports of the edge device, and wherein each plurality of RF ports is operationally dependent on the power state of a common edge device hardware component operating upstream of the RF ports.

* * * * *